United States Patent Office 2,724,701
Patented Nov. 22, 1955

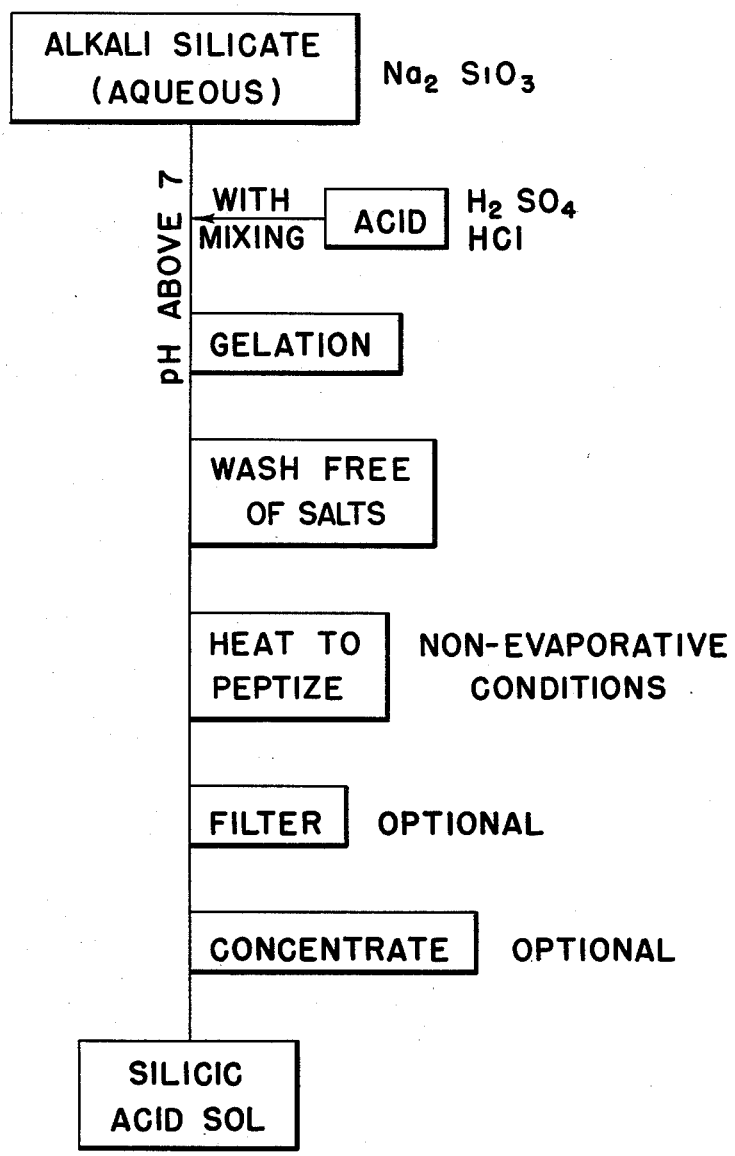

2,724,701

PREPARATION OF SILICIC ACID SOLS

Casimer C. Legal, Jr., Pasadena, Md., assignor to W. R. Grace & Co., New York, N. Y., a corporation of Connecticut Application October 25, 1951, Serial No. 253,038

5 Claims. (Cl. 252—313)

This invention relates to the preparation of silicic acid sols. In one of its specific aspects, it relates to a method of preparing silicic acid sols containing a minimum amount of impurities. In another specific aspect, it relates to stable silicic acid sols of relatively high silica content substantially free of contaminating impurities.

It is known to produce a silica gel by reacting an alkaline silicate, such as sodium silicate, with a strong mineral acid, such as sulphuric acid, to produce a silica hydrogel, washing the hydrogel to remove water soluble impurities and drying the washed material to produce the desired gel. It has also been disclosed that silicic acid sols can be formed by treating the washed hydrogels with an alkaline agent such as ammonia and heating the ammonia-containing material to effect a reversion of the gel to a silica-containing sol. However, in all of the prior art methods of effecting a reversion of the hydrogel to a silicic acid sol, the hydrogel is formed by adding a soluble silicate to a strong mineral acid. Thus, the hydrogels are formed at pH values below 7, and usually around values of about 1.5 to 4.

In accordance with the present invention, it is now possible to form a stable silicic acid sol comprising silica and water with substantially no contaminating impurities by forming the hydrogel at a pH above 7, washing the hydrogel to remove water soluble impurities and heating the washed material in a non-evaporative atmosphere. This heating effects a reversion of the hydrogel to the desired stable silicic acid sol.

It is, therefore, an object of the present invention to provide a method of forming a stable, silicic acid sol.

It is another object of the present invention to provide a stable, concentrated colloidal solution of silica and water having substantially no contaminating impurities.

It is another object of this invention to provide a method of peptizing a silica hydrogel.

The foregoing and other objects will be apparent to those skilled in the art from the following drawing, description, and the appended claims in conjunction with the drawing which is a flow sheet.

The single figure is a diagrammatic representation of a flow sheet illustrating the several steps of the process of this invention.

In accordance with the present invention, an aqueous solution of a soluble silicate, such as an alkaline silicate, is treated with a strong acid to produce a hydrogel. I may use any water-soluble alkali silicate which is precipitated by acid. However, I prefer to use sodium silicate because it is readily available and is cheaper than the others.

Sodium silicate is commercially obtained as water glass and may be employed in concentrations ranging up to about 10% silica content. The exact concentration is determined by practical operating conditions. As a practical matter, it is, of course, desirable to operate at high concentrations. However, at concentrations above about 10% of silica, the reaction with acid is so rapid that gelation occurs before complete mixing of the acid and silicate solution is obtained with the result that a portion of the silicate is lost in the subsequent washing operation. As a lower limit, the silicate concentration must be such that the gel formed by acid addition is sufficiently stiff to permit washing without appreciable loss.

For forming the hydrogel I may use any strong acid, or fairly strong acid which will react with the sodium or alkaline silicate to effect gelation. For this purpose, the most generally used acids are the strong mineral acids, particularly sulphuric and hydrochloric, sulphuric being normally preferred because of its relatively low cost. The concentration of the acid is not critical except for practical operating limits. At a practical lower limit, it is not desirable to operate at such a low acid concentration that the final hydrogel is so dilute that it will not properly stiffen. If, however, the acid concentration is too high, the setting time of the hydrogel may be undesirably short.

In reacting the acid with the alkaline silicate to form the hydrogel in accordance with my invention, the acid and silicate solution are admixed under such conditions and in such proportions that the pH of the mixture is never permitted to go below 7. The mixing may be carried out batch-wise by adding the acid to a prepared batch of aqueous alkaline silicate, in which case, the pH of the alkali silicate solution which is originally in the range of 13 to 13.5, will be reduced by the addition of the acid to a value of not less than 7 and preferably in the range of 10.0 to 11.0.

Instead of the batch-wise reaction, the preferred method of mixing is to bring the acid and silicate of appropriate concentrations together in continuous streams in a mixing nozzle where immediate and complete reaction is effected and from which the product is discharged into an appropriate container where it is allowed to set. With this type of mixing, higher concentrations of materials may be used since the time necessary for obtaining complete mixing is exceedingly short. However, it is necessary that the two streams of reactants be carefully controlled so that the pH of the mixture does not drop below the critical value of 7.

In either type of mixing, it is preferred to operate at low ambient temperatures in order that the maximum setting time may be realized. It is not necessary that artificial cooling be used but it is desirable that external heating not be used. This is particularly important in the batch-wise operation, since the entire batch must be continuously agitated during the acid addition.

The reaction mixture is then to set for a sufficient time to form the firm hydrogel, the exact time depending upon the conditions used in forming the batch such as the temperature and concentration of reactants. After gelation is complete, the hydrogel is prepared for washing by cutting it into lumps of appropriate size. This is conventional in the preparation of silica gels and is ordinarily carried out by dumping the hydrogel onto a screen or grid having openings of appropriate size and forcing the hydrogel through this screen to cut it into lumps of the desired size.

The sized hydrogel is then washed with water to free it of water soluble impurities, such as the salts formed in the reaction between the alkaline silicate and the acid. This washing may be carried out by conventional means and in a conventional manner. One convenient method is to deposit the hydrogel lumps in a vessel having a false bottom with a water inlet below the false bottom and a water outlet in an upper portion above the level of the hydrogel lumps. Water is introduced into this vessel through the inlet and flows upwardly through the vessel in contact with the hydrogel lumps and is withdrawn through the overflow. It is preferred to carry out this washing step at a low temperature in order to minimize the loss of silica during the washing step. Obviously, it is desirable that the wash water have the lowest practical content of soluble salts in order that contaminants not be introduced into the gel by the wash water. Washing is continued until the hydrogel is substantially free of contaminating salts. If desired, any other means and method may be used for washing the hydrogel, provided such washing removes the contaminating salts. After the hydrogel has been washed, it is drained and may be squeezed or possibly mulled to remove as much of the moisture as possible.

The washed hydrogel is then placed in a suitable container and is heated under non-evaporative conditions to peptize the hydrogel and produce a silica sol. If the heating is to be carried out at atmospheric pressure, it is important that the temperature not be allowed to rise above about 212° F. and it is desirable that the temperature be maintained below about 200° F., since above this temperature the vapor pressure of water is rapidly approaching the atmospheric pressure and evaporation losses may be appreciable. It is preferable that the hydrogel be heated in a closed vessel such as an autoclave so that the loss of water is maintained at a minimum. This heating effects a peptization of the hydrogel and causes a reversion to the silicic acid sol.

If desired, means may be provided for agitating the hydrogel during the peptization step, which may result in more rapid reversion of the hydrogel to the sol state. The silicic acid sols formed in accordance with the procedure described in the foregoing paragraphs are extremely stable and do not precipitate even on extended standing.

By using the foregoing procedures, I have prepared silicic acid sols containing colloidal silica and a minimum amount of contaminating impurities wherein the silica content is in the range of 5½ to 6%. These solutions may be concentrated even further by appropriate concentration as by vacuum evaporation. However, concentration by simple boiling may result in coagulation of the silica. The silica sols prepared in accordance with the present invention can be coagulated by the addition of non-polar solvents such as alcohol or acetone, or by freezing or acidulation with mineral acids. While some electrolytes precipitate the silica, these solutions are stable to acid salts, such as sodium acid sulfate. The present invention may be more fully understood from the following examples, which are presented by way of explanation and not in limitation.

*Example I*

300 milliliters of 26.5° Bé. sulphuric acid was gradually added with stirring to 4650 milliliters of 10.5° Bé. sodium silicate solution. The final mixture, which had a pH of about 10.5 was allowed to set to a hydrogel, which was then crushed and washed for 20 hours with cold untreated tap water. The washed material was then placed in a covered container and heated for two hours in an oven at 90° C. This treatment peptized the hydrogel and produced an opalescent, non-viscous, liquid silica sol, analysis of which gave the following results:

|  | Per cent |
|---|---|
| Moisture | 93.92 |
| $SiO_2$ | 5.44 |
| $Na_2O$ | 0.37 |
| $SO_4$ | 0.12 |

*Example II*

A portion of the washed hydrogel prepared in Example I was placed in a cloth bag and kneaded to remove excess water. The mass thus treated was heated as described in Example I. The resulting silica sol had the following composition:

|  | Per cent |
|---|---|
| Moisture | 89.49 |
| $SiO_2$ | 9.38 |
| Unaccounted | 1.13 |

The materials prepared in Examples I and II were tested and found to have the following properties:
1. pH greater than 7 (about 9.1).
2. Silica was precipitated by freezing.
3. Silica was precipitated by the addition of alcohol or acetone.
4. A silica hydrogel was formed when the pH was reduced below 7 by the addition of acid.
5. Silica was precipitated by sodium sulfate, barium chloride, but not by sodium acid sulfate.
6. These sols showed no tendency to settle after five months standing.

In the foregoing examples, the hydrogel was washed until the washings gave no precipitate with barium chloride.

Silica sols, such as those with which the present invention is concerned are useful in the preparation of non-skid floor waxes, adhesives or binders, water-repellent coatings, textile sizes and as additives to decrease the water sensitivity of certain coatings such as polyvinyl acetate, casein, starch, and latex films. These are merely a few of the many uses to which these silica sols can be put.

The examples and conditions described herein are presented for the purpose of illustration and not with the intent to limit the present invention thereto, the scope of which is indicated in the appended claims.

I claim:
1. The method of preparing a silicic acid sol comprising forming a silica hydrogel by reacting an acid with a water soluble silicate at a pH above 7, washing said hydrogel to remove soluble constituents and without further treatment thereof heating the washed hydrogel alone under non-evaporative conditions to form a silicic acid sol.

2. The method of preparing a silicic acid sol comprising forming a silica hydrogel by adding an acid to an aqueous solution of alkali silicate, maintaining the pH of above 7, water-washing said hydrogel to remove soluble constituents and without further treatment thereof heating the washed hydrogel alone under non-evaporative conditions to form a silicic acid sol.

3. The method described in claim 2 wherein the hydrogel is formed by adding sulphuric acid to a sodium silicate solution.

4. The method of preparing a silicic acid sol containing colloidal silica and water which comprises forming a silica hydrogel by adding sulphuric acid to a sodium silicate solution while maintaining the pH of said solution above 7, washing said hydrogel to remove water soluble constituents and without further treatment thereof heating the washed hydrogel alone at a temperature below the boiling point of water under the ambient conditions to produce a reversion of the hydrogel to the silicic acid sol.

5. The method described in claim 4 wherein the reversion step is carried out at atmospheric pressure and at a temperature above about 185° F. and below 212° F.

References Cited in the file of this patent

UNITED STATES PATENTS

| 2,375,738 | White | May 8, 1945 |
| 2,386,810 | Marisic | Oct. 16, 1945 |
| 2,572,578 | Trail | Oct. 23, 1951 |